US010249889B2

(12) United States Patent
Ueda et al.

(10) Patent No.: US 10,249,889 B2
(45) Date of Patent: Apr. 2, 2019

(54) FUEL CELL SYSTEM (71) Applicant: HONDA MOTOR CO., LTD., Tokyo (JP)

(72) Inventors: Kenichiro Ueda, Saitama (JP); Kenji Taruya, Saitama (JP); Masakazu Hamachi, Saitama (JP); Nobuki Koiwa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 14/394,915

(22) PCT Filed: Apr. 12, 2013

(86) PCT No.: PCT/JP2013/061014
§ 371 (c)(1),
(2) Date: Oct. 16, 2014

(87) PCT Pub. No.: WO2013/157488
PCT Pub. Date: Oct. 24, 2013

(65) Prior Publication Data
US 2015/0086894 A1    Mar. 26, 2015

(30) Foreign Application Priority Data

Apr. 16, 2012    (JP) .................................. 2012-092667

(51) Int. Cl.
*H01M 8/04111*    (2016.01)
*H01M 8/04089*    (2016.01)
(Continued)

(52) U.S. Cl.
CPC .... *H01M 8/04111* (2013.01); *H01M 8/04089* (2013.01); *H01M 8/04126* (2013.01);
(Continued)

(58) Field of Classification Search
None
See application file for complete search history.

(56) References Cited

U.S. PATENT DOCUMENTS

| 2010/0009226 A1* | 1/2010 | Konrad | H01M 8/04014 |
|---|---|---|---|
| | | | 429/415 |
| 2010/0055522 A1* | 3/2010 | Manabe | B60L 1/003 |
| | | | 429/431 |

FOREIGN PATENT DOCUMENTS

| CN | 101116206 A | 1/2008 |
|---|---|---|
| CN | 100570939 C | 12/2009 |

(Continued)

OTHER PUBLICATIONS

Arisawa (JP 2009-123550 A, machine translation) (Jun. 2009).*
(Continued)

*Primary Examiner* — Wojciech Haske
(74) *Attorney, Agent, or Firm* — Squire Patton Boggs (US) LLP (57) ABSTRACT A fuel cell system comprises: a turbo type oxidizing agent pump, the rotary shaft of which is pivotally supported by an air bearing to take in and supply an oxidizing agent gas to a fuel cell by the rotary motion; an actual flow rate detection means for the oxidizing agent gas; a pressure adjustment means for the oxidizing agent gas; a rotary speed monitoring means for the oxidizing agent pump; and a control means which, when the rotary speed of the oxidizing agent pump is within the range of the minimum rotary speed that allows the rotary shaft to be pivotally supported by the air bearing, if the actual flow rate of the oxidizing agent gas is larger than a target flow rate, increases the pressure of the oxidizing agent gas via the pressure adjustment means.

3 Claims, 6 Drawing Sheets (51) Int. Cl.
*H01M 8/04119* (2016.01)
*H01M 8/0438* (2016.01)
*H01M 8/04746* (2016.01)

(52) U.S. Cl.
CPC ... *H01M 8/04395* (2013.01); *H01M 8/04425* (2013.01); *H01M 8/04753* (2013.01); *H01M 2250/20* (2013.01); *Y02T 90/32* (2013.01)

(56) References Cited

FOREIGN PATENT DOCUMENTS

| | | |
|---|---|---|
| JP | 2000-306595 A | 11/2000 |
| JP | 2007-220538 A | 8/2007 |
| JP | 2007-270651 A | 10/2007 |
| JP | 2009-123550 A | 6/2009 |
| JP | 2010-15733 A | 1/2010 |
| JP | 2010-108755 A | 5/2010 |
| JP | 2010-241384 A | 10/2010 |
| WO | 2006/126746 A1 | 11/2006 |

OTHER PUBLICATIONS

Taniguchi et al. (JP 2007-270651 A, machine translation) (Oct. 2007).*
Japanese International Search Report application No. PCT/JP2013/061014 dated Jun. 18, 2013.
Chinese Office Action application No. 201380020155.5 dated Dec. 31, 2015.

* cited by examiner

FIG.5

FUEL CELL SYSTEM

TECHNICAL FIELD

The present invention relates to a fuel cell system which generates electric power by use of fuel gas and oxidant gas.

BACKGROUND ART

The fuel cell system is a power generating system in which a fuel cell (fuel-cell stack) electrochemically generates electric power by use of fuel gas supplied from a fuel-gas source and oxidant gas supplied from an oxidant-gas source. Usually, air is used as the oxidant gas, and pumped by a compressor to the fuel cell.

According to Patent Literature 1, a controller calculates the target rotational speed of the compressor pumping the air to the fuel cell, on the basis of the accelerator position, the vehicle speed, and the air flow rate in a fuel-cell car, and controls the rotational speed of the compressor and the flow rate of the air fed to the fuel cell. For example, when the value of the flow rate detected by a flow-rate sensor is within a normal range calculated on the basis of the operational condition of the fuel cell, the air flow rate is feedback controlled by use of the detected value of the flow rate. When the detected value of the flow rate deviates from the normal range, the air flow rate (the rotational speed of the compressor) is feedforward controlled.

CITATION LIST

Patent Literature

Patent Literature 1: Japanese Patent Laid-Open No. 2010-241384

SUMMARY OF INVENTION

Technical Problem

Figure 4:
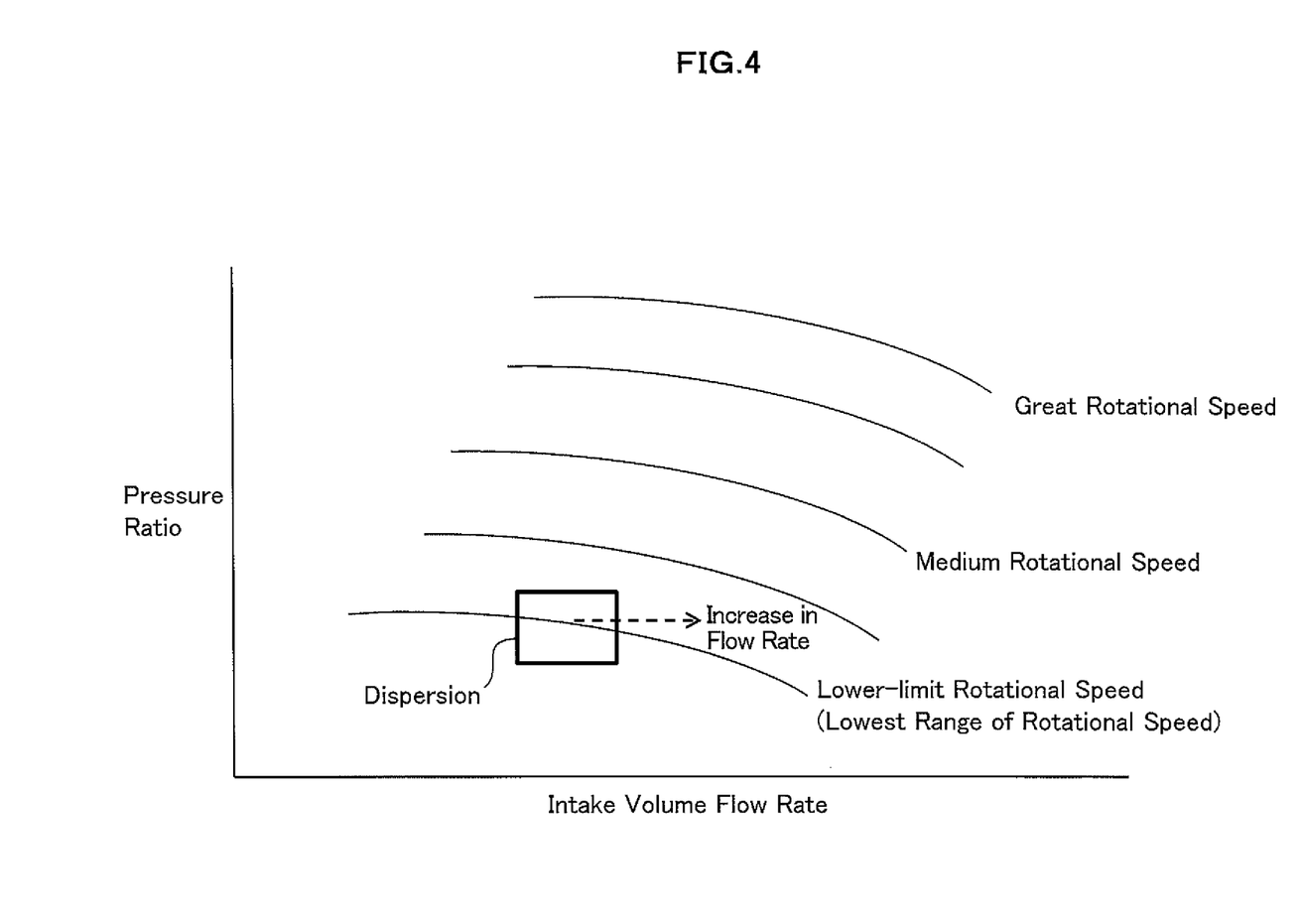
FIG. 4 is a diagram indicating a characteristic of an air pump, where the abscissa corresponds to an intake volume flow rate, and the ordinate corresponds to a pressure rate.

Incidentally, a type of the above compressor is the turbo type air pump, the shaft of which is supported by an air bearing. In some cases where the air bearing is used, air cannot be fed to the fuel cell at a desired flow rate by the control of the rotational speed only. Specifically, in the case where an attempt to feed the air at a desired air flow rate is made by feedback control of the rotational speed using the detected value of the air flow rate, when a command value of the rotational speed is near the lowest rotational speed which is needed for flotation of the shaft by the air bearing, the air cannot be fed at the desired air flow rate by the control of the rotational speed only. For example, it is found that when the command value of the rotational speed of the air pump is fixed to the lower limit because of errors in the flow-rate sensor and variations in the intake air pressure and the temperature, the flow rate of the air pump greatly increases due to a characteristic specific to the air pump. (See FIG. 4.)

It is also found that the above phenomenon becomes prominent particularly in the system in which a device (such as a humidifier bypass valve) which changes the magnitude of the pressure loss is arranged between the air pump and the fuel cell.

In view of above, the object of the present invention is to solve the above problem, and provide a fuel cell system in which appropriate feeding at the target flow rate can be realized.

Solution to Problem (1) According to the present invention which accomplishes the above object, a fuel cell system is provided. The fuel cell system is characterized in including: a fuel cell to which fuel gas and oxidant gas are fed and which generates electric power; an oxidant feed path to the fuel cell; an oxidant pump of a turbo type in which a shaft is supported by an air bearing, and which takes in and sends out the oxidant gas by rotary motion; an actual-flow-rate detection means for the oxidant gas; a pressure control means for the oxidant gas; a rotational-speed confirmation means for the oxidant pump; and a control means which increases the pressure of the oxidant gas through the pressure control means when the actual flow rate of the oxidant gas is greater than a target flow rate while the rotational speed of the oxidant pump is within a lowest range of the rotational speed in which the air bearing can support the shaft.

According to the present invention, when the actual flow rate of the oxidant gas is greater than the target flow rate, the pressure of the oxidant gas is increased, and the actual flow rate by the air pump is controlled.

(2) An additional feature of the fuel cell system according to the present invention is that the control means sets the target flow rate and a target pressure on the basis of a value of current requested from the fuel cell, and when the actual flow rate is greater than the target flow rate the control means sets a sum of a first predetermined value and the target pressure as a new target pressure.

According to the present invention described above, when the actual flow rate of the oxidant gas is greater than the target flow rate, the target pressure is increased (the oxidant pressure is raised), and therefore the actual flow rate by the air pump is controlled.

(3) An additional feature of the fuel cell system according to the present invention is that the fuel cell system further includes: a humidifier arranged between the oxidant pump and the fuel cell; a humidifier bypass which bypasses the humidifier; and an oxidant-flow regulating means which controls proportions of the oxidant gas between the humidifier and the humidifier bypass. In the fuel cell system, the control means sets the target pressure according to the proportions controlled by the oxidant-flow regulating means.

According to the present invention described above, even in the case where the flow rate of the oxidant gas fed to the fuel cell is unchanged, the pressure loss in the oxidant flow in the section between the oxidant pump and the fuel cell differs according to the controlled proportion of the flow to the humidifier bypass. Even in this case, the target pressure is set according to the controlled proportion.

(4) An additional feature of the fuel cell system according to the present invention is that a value of pressure loss in an oxidant flow is obtained on the basis of a relationship among the proportions controlled by the oxidant-flow regulating means, the target flow rate, and the pressure loss in the oxidant flow, and in the case where a sum of the target pressure and the value of the pressure loss in the oxidant flow is smaller than a predetermined value a sum of a second predetermined value and the target pressure is set as a new target pressure.

According to the present invention described above, for example, the control operations in step S22 to S29 in the second embodiment explained later are performed, so that the flow rate through the oxidant pump can be controlled more appropriately.

(5) An additional feature of the fuel cell system according to the present invention is that the oxidant-flow regulating means is a flow-rate regulator valve arranged in the humidifier bypass, and in the case where an aperture of the flow-rate regulator valve is set greater than a predetermined aperture the control means sets a sum of a predetermined value and the target pressure is set in advance as a new target pressure.

Since the aperture of the flow-rate regulator valve is increased, the pressure loss in the section between the oxidant pump and the fuel cell is reduced, and the flow rate of the oxidant gas tends to increase. Therefore, according to the present invention described above, increase in the flow rate of the oxidant gas is suppressed by increasing the target pressure by adding the predetermined value to the target pressure.

(6) In addition, according to the present invention, another fuel cell system is provided. The fuel cell system is characterized in including: a fuel cell to which fuel gas and oxidant gas are fed and which generates electric power; an oxidant feed path through which the oxidant gas to be fed to the fuel cell flows; an oxidant exhaust path through which fuel off-gas exhausted from the fuel cell flows; an oxidant pump of a rotary type which takes in and sends out the oxidant gas by rotary motion; an actual-flow-rate detection means which detects an actual flow rate of the oxidant gas; a rotational-speed confirmation means which confirms a rotational speed of the oxidant pump; a back pressure valve which is arranged in the oxidant exhaust path and controls a pressure of the oxidant gas fed to a cathode of the fuel cell; and a control means which controls the back pressure valve to decrease an aperture of the back pressure valve in steps smaller than steps in which the aperture of the back pressure valve is controlled to increase, in the case where the actual flow rate is greater than the target flow rate even when the rotational speed of the oxidant pump is lowered to a lowest range of the rotational speed after the back pressure valve is controlled to increase the aperture.

According to the present invention described above, in the case where the actual flow rate is greater than the target flow rate even when the rotational speed of the oxidant pump is lowered to the lowest range of the rotational speed after the back pressure valve is controlled to increase the aperture, the back pressure valve is controlled to decrease the aperture in steps smaller than the steps in which the aperture of the back pressure valve is controlled to increase, so that the pressure of the oxidant gas rises and the actual flow rate can be lowered to the target flow rate.

(7) An additional feature of the fuel cell system according to the present invention is that the fuel cell system further includes a pressure detection means which detects the pressure of the oxidant gas fed to the cathode, and the control means completes control of the aperture of the back pressure valve when the pressure rises to a predetermined pressure.

According to the present invention described above, the control means determines the completion of the control of the aperture of the back pressure valve on the basis of the detected value of the pressure of the oxidant gas. Therefore, the timing of the completion of the control of the aperture of the back pressure valve can be appropriately controlled.

(8) An additional feature of the fuel cell system according to the present invention is that the control means controls the aperture of the back pressure valve in the case where an output of the fuel cell is set in a predetermined low-output state.

According to the present invention described above, the control means can control the actual flow rate of the oxidant gas to be the target flow rate by controlling the aperture of the back pressure valve, for example, even in the case where the vehicle (car) in which the fuel cell system is mounted decelerates and transitions to an idle state (a predetermined low-output state).

(9) An additional feature of the fuel cell system according to the present invention is that the control means controls the aperture of the back pressure valve when an output of the fuel cell is maintained in a predetermined low-output state.

According to the present invention described above, the actual flow rate can be lowered to the target flow rate by controlling the aperture of the back pressure valve, for example, even in the case where lowering of the actual flow rate of the oxidant gas to the target flow rate becomes impossible during an idle state (a predetermined low-output state) of a vehicle (car) in which the fuel cell system is mounted.

Effect of Invention

According to the present invention, the fuel cell systems which enables appropriate feeding at a target flow rate.

DESCRIPTION OF EMBODIMENTS

«First Embodiment»

An aspect (embodiment) of the present invention is explained in detail below with reference to accompanying drawings.

Figure 1:
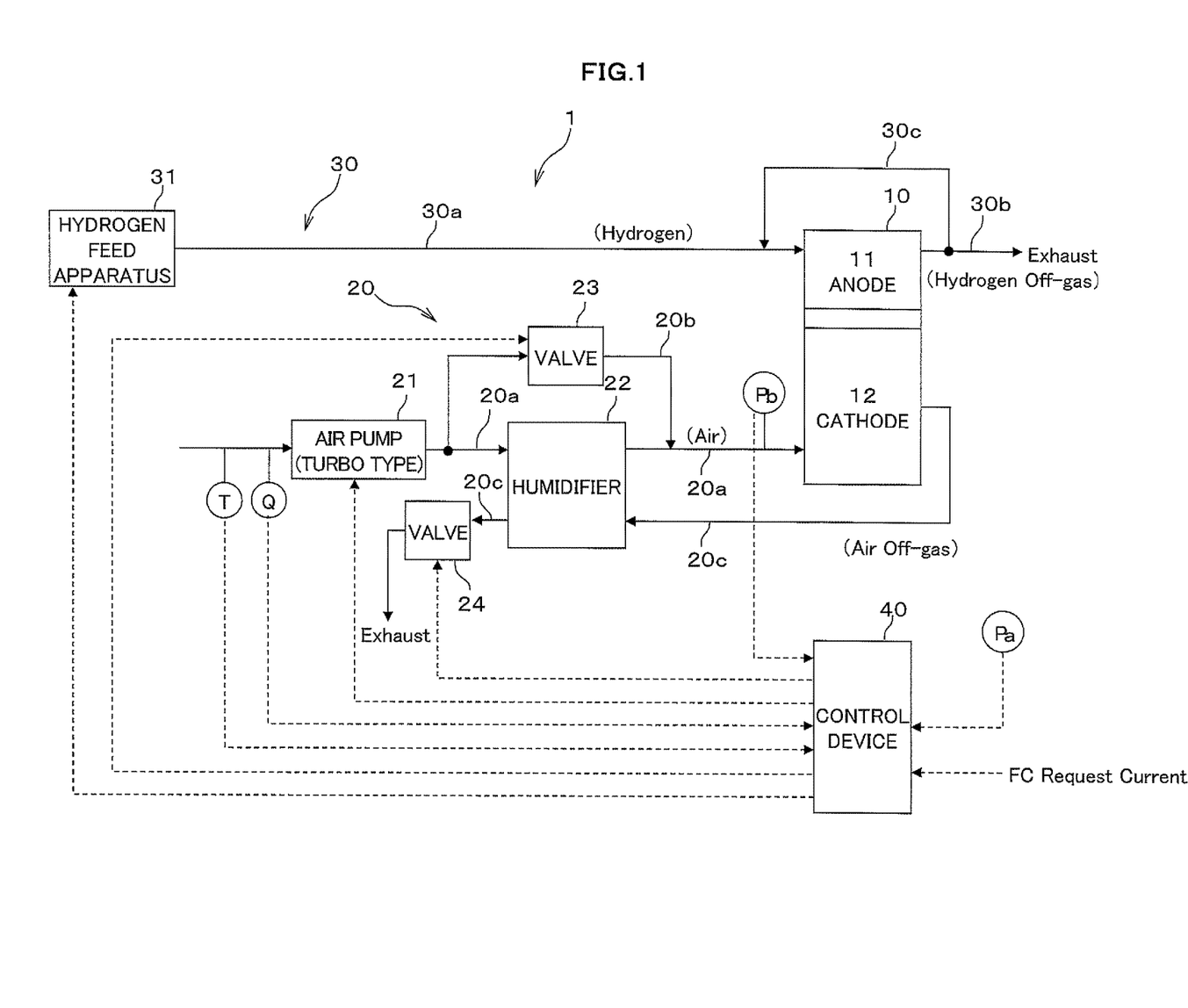
FIG. 1 is a diagram illustrating a configuration common to fuel cell systems according to embodiments (first and second embodiments) of the present invention.

FIG. 1 is a diagram schematically illustrating the entire configuration of a fuel cell system 1 according to an embodiment of the present invention. The fuel cell system is assumed to be mounted as a power supply on a fuel-cell vehicle, which runs on electric motors.

As illustrated in FIG. 1, the fuel cell system 1 includes a fuel cell 10, an air feed system 20, a hydrogen feed system 30, a control device 40, and other components. The air feed system 20 feeds and exhausts air as the oxidant gas to and from the fuel cell 10. The hydrogen feed system 30 feeds and exhausts hydrogen as fuel gas to and from the fuel cell 10. The control device 40 controls the fuel cell system 1.

The fuel cell 10 is a known electric power generator which includes an anode (hydrogen electrode) 11 and a cathode (air electrode) 12, and electrochemically generates electric power by use of hydrogen and air, which are respectively fed to the anode 11 and the cathode 12.

The air feed system 20 includes as main constituents an air pump 21, a humidifier 22, a humidifier bypass valve 23, and a back pressure valve 24. The air feed system 20 includes air feed piping 20a, bypass piping 20b, and air exhaust piping 20c. The air feed piping 20a feeds air by connecting the air pump 21 and an inlet side of the cathode 12 in the fuel cell 10 through the humidifier 22. The bypass piping 20b bypasses the humidifier 22. The air exhaust piping 20c exhausts air off-gas through the humidifier 20, where the air off-gas is exhausted from the outlet side of the cathode 12 in the fuel cell 10. The humidifier bypass valve 23 is provided in the bypass piping 20b. Since the above constituents are generally used types, explanations on the above constituents are not presented here.

The air pump 21 is a turbo type supported by an air bearing as explained in the "Background Art", and has functions of taking air in and sending air out by rotary motion. The air pump 21 has a characteristic feature that the air pump 21 cannot achieve a desired air flow rate when a command value of the rotational speed is near the lowest rotational speed (in the lowest range of the rotational speed) which is necessary for flotation of the shaft in the air bearing. (See FIG. 4.)

The control device 40 is assumed to confirm the rotational speed of the air pump 21 by the command value of the rotational speed, which is generated by the control device 40. Alternatively, the fuel cell system 1 may be provided with a rotational-speed sensor using a Hall device, and the control device 40 may confirm the rotational speed of the air pump 21 by the rotational-speed sensor. Further, a technique for controlling rotation in a sensorless manner is generally known. Further, although the humidifier bypass valve 23 is used as the "oxidant-flow regulating means", alternatively, another valve, instead of or in combination with the humidifier bypass valve 23, may be arranged immediately in front of the inlet of or immediately at the back of the outlet of the humidifier 22. In this case, it is possible to consider that the above valve, instead of or in combination with the humidifier bypass valve 23, realizes the "oxidant-flow regulating means".

The hydrogen feed system 30 includes a hydrogen feed apparatus 31 as a main constituent. The hydrogen feed system 30 includes hydrogen feed piping 30a, hydrogen exhaust piping 30b, and hydrogen return piping 30c. The hydrogen feed piping 30a feeds hydrogen to the anode 11 in the fuel cell 10, the hydrogen exhaust piping 30b exhausts hydrogen off-gas emitted from the anode 11 in the fuel cell 10, and the hydrogen return piping 30c branches off from the hydrogen exhaust piping 30b and returns to the hydrogen feed piping. Although the hydrogen feed apparatus 31 is assumed to be provided with a hydrogen reservoir (not shown) reserving hydrogen at a very high pressure of, for example, 30 MPa or 70 MPa. Alternatively, a reforming apparatus which generates hydrogen by reforming or the like of liquid raw fuel such as methanol may be provided in the hydrogen feed apparatus 31.

Some types of constituents of the hydrogen feed system 30 such as ejectors and purge valves which are generally used are not shown in FIG. 1, and explanations on such constituents are not presented.

The control device 40 includes a CPU (Central Processing Unit), a RAM (Random Access Memory), a ROM (Read Only Memory), various interfaces, and other components. The control device 40 is connected to an atmospheric pressure sensor Pa, an intake-air temperature sensor T, a flow-rate sensor Q, and a pressure sensor Pb through the various interfaces so that the values detected by the above sensors are inputted into the control device 40. The control device 40 is further connected to another control device (not shown) which determines a value of current requested from the fuel cell 10, so that the value of the requested current is inputted to the control device 40. (Hereinafter, the value of the requested current is referred to as "the FC request current".) The FC request current is approximately the sum of a value of current obtained in proportion to the amount of depression of a throttle pedal and a value of current obtained in proportion to the amount of operation of an auxiliary machine or the like.

In addition, the control device 40 is connected to the air pump 21 (and a drive circuit for the air pump 21), the humidifier bypass valve 23 (and a drive circuit for the humidifier bypass valve 23), and the back pressure valve 24 (and a drive circuit for the back pressure valve 24) through the various interfaces. The control device 40 is configured to generate a command value of the rotational speed of the air pump 21, send the command value of the rotational speed to the air pump 21, generate command values of the apertures of the humidifier bypass valve 23 and the back pressure valve 24, and send the command values of the apertures to the humidifier bypass valve 23 and the back pressure valve 24. When the command value of the rotational speed increases, the rotational speed of the air pump 21 increases, so that the flow rate of air fed to the cathode 12 in the fuel cell 10 increases (i.e., the flow rate detected by the flow-rate sensor Q increases). When the aperture of the humidifier bypass valve 23 increases, the flow rate of air flowing through the humidifier 22 decreases (i.e., the flow rate of air fed to the cathode 12 without passing the humidifier 22 increases). When the aperture of the back pressure valve 24 increases, the pressure at the cathode 12 decreases (i.e., the pressure detected by the pressure sensor Pb decreases).

Although the control device 40 in the present embodiment actively controls the flow rate of the air fed by the air feed system 20 by controlling the rotational speed of the air pump 21, the control device 40 does not specifically control the flow rate of hydrogen in the hydrogen feed system 30. The control device 40 is configured such that the feed rate of hydrogen from the hydrogen feed apparatus 31 through a regulator (not shown) automatically (passively) increases when the amount of hydrogen consumed at the anode 11 increases.

The operations of the fuel cell system 1 according to the first embodiment having the above configuration are explained below with reference to the flow diagram of FIG. 2. In addition, the operations of controlling the humidifier bypass valve 23 are explained with reference to the flow diagram of FIG. 3.

First, the current which the fuel cell 10 is requested to generate (i.e., the FC request current) is set by the other control device on the basis of the amount of depression of the throttle pedal and the load of an air conditioner (the amount of operation of an auxiliary machine and the like) in consideration of charging and discharging of a high-voltage battery (not shown), and the FC request current is sent to the control device 40. The control device 40 calculates (in step S10) a target flow rate of the air to be fed to the fuel cell 10 on the basis of the FC request current by reference to a table, a map, or the like which is memorized in advance. Similarly, the control device 40 calculates (in step S20) a target air pressure on the basis of the FC request current by reference to a table, a map, or the like. The target air pressure is for the pressure at the inlet to the cathode 12 (at the position of the pressure sensor Pb).

The back pressure valve 24 is feedback (F/B) controlled (in step S30) to adjust the aperture such that the value of the air pressure detected by the pressure sensor Pb is equalized with the target air pressure calculated in step S20. In addition, the rotational speed of the air pump 21 is feedback controlled (in step S40) such that the value of the air flow rate detected by the flow-rate sensor Q is equalized with the target air flow rate calculated in step S10. That is, the control device 40 feedback controls the air pump 21 and the back pressure valve 24 by setting (generating) the command value of the rotational speed and the command values of the apertures. At this time, the air flow rate is assumed to be corrected with the air temperature detected by the intake-air temperature sensor T and the air pressure (atmospheric pressure) detected by the atmospheric pressure sensor Pa.

Incidentally, the shaft of the air pump 21 in the present embodiment is supported by the air bearing as explained before, and the rotational speed of the air pump 21 is controlled to be higher than the lowest (lower-limit) rotational speed needed for flotation of the shaft in the air bearing. For example, in the case where the amount of depression of the throttle pedal or the amount of operation of an auxiliary machine is small, or in the case where discharge operations from the high-voltage battery are mainly performed, power generation by the fuel cell 10 is not needed, so that the rotational speed of the air pump 21 can become close to the lower limit. However, the air pump 21 is configured such that the rotational speed is slightly higher than the lower limit even in the above cases. Nevertheless, in some cases, variations of the intake air pressure and the intake air temperature (i.e., the weather condition or environment) cause the rotational speed of the air pump 21 to be fixed to the lower limit. Conventionally, the air flow rate cannot be appropriately controlled at the lower limit of the rotational speed as above. For example, the air flow rate can unintendedly increase at the lower limit of the rotational speed as above. (That is, the actual flow rate does not achieve the target flow rate.)

Therefore, according to the first embodiment, it is determined (in step S50) whether or not the rotational speed of the air pump 21 is equal to the lowest rotational speed (the lower limit). When the rotational speed of the air pump 21 is not equal to the lower limit, the operation returns (Return) to step S10, and the operations beginning from step S10 are repeated. The lower limit is appropriately set by experiment or simulation.

When the rotational speed of the air pump 21 is equal to the lower limit, i.e., when YES is determined in step S50, it is determined (in step S60) whether or not the air flow rate (the measured value) is greater than the target air flow rate. This is because according to the characteristic of the air pump 21 the shaft of which is supported by an air bearing, the air flow rate greatly increases (to become greater than the target flow rate) in some cases where the rotational speed of the air pump is equal to the lower limit. (That is, the actual flow rate can becomes greater than the target flow rate.) As mentioned before, the control device 40 confirms the rotational speed of the air pump 21 on the basis of the command value of the rotational speed, which is generated by the control device 40.

When the air flow rate is not greater than the target air flow rate, i.e., when NO is determined in step S60, this situation can be regarded to be normal. Therefore, the operation returns (Return) to step S10, and the operations beginning from step S10 are repeated. On the other hand, when the air flow rate is greater than the target air flow rate, i.e., when YES is determined in step S60, the control device 40 sets (in step S70) a new target air pressure by adding a first predetermined value (which is equal to or greater than zero) to the target air pressure which is set in step S20. Then, the control device 40 controls the back pressure valve 24 to decrease the aperture in order to equalize the air pressure with the target air pressure (in step S80). That is, the control device 40 controls the air flow rate so as to suppress excessive air flow. This control may be one or both of feedforward control and feedback control. The feedforward control has a characteristic feature that the response is quick. The first predetermined value is set by experiment or simulation, and may either a fixed value or a variable value which varies with, for example, the deviation of the air flow rate from the target flow rate.

Figure 2:
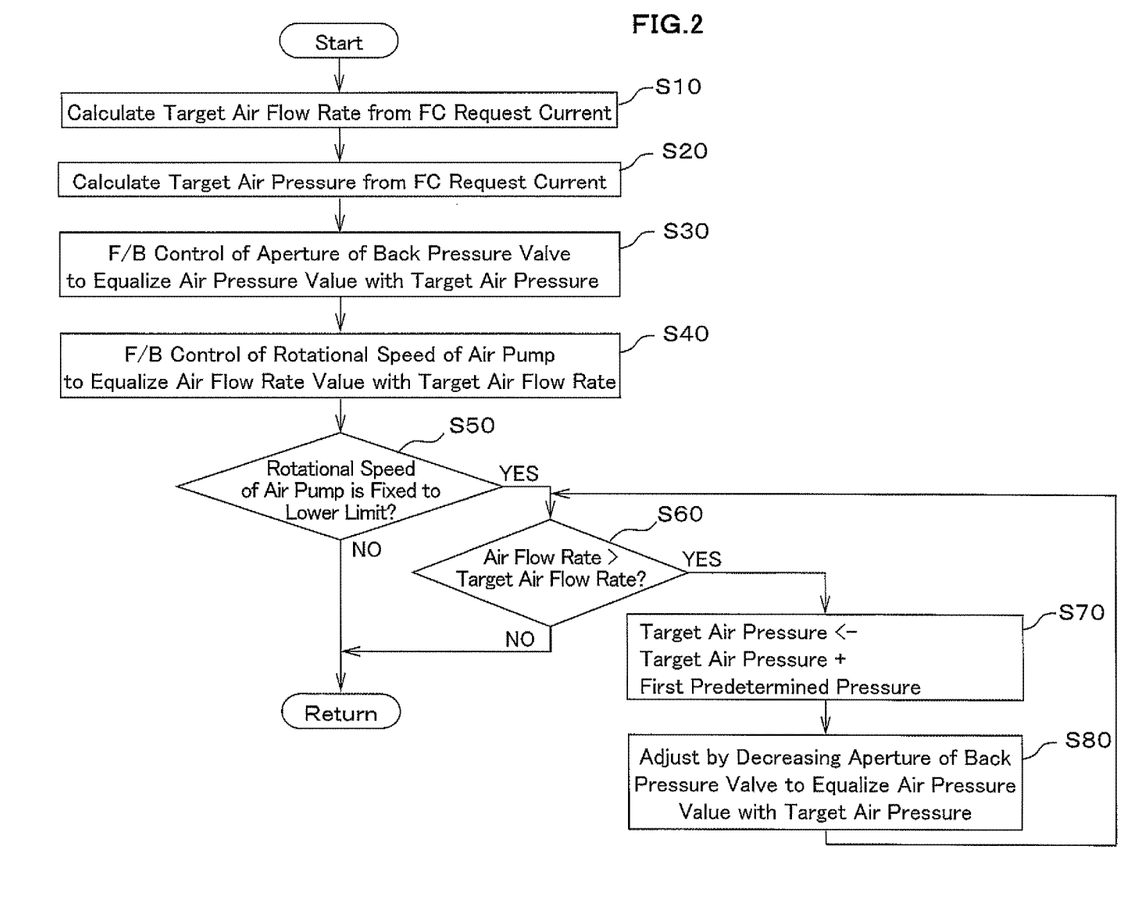
FIG. 2 is a flow diagram of control operations according to the first embodiment of the present invention.

After the operation in step S80, the operation goes to step S60 to continue the operations of FIG. 2.

According to the first embodiment, when the rotational speed of the air pump 21 reaches the lower limit and the air flow rate becomes greater than the target air flow rate, i.e., when YES is determined in both of steps S50 and S60, the air flow rate becomes excessive and out of control. Therefore, the control device 40 sets a great value as the target air flow rate (in step S70), and controls the back pressure valve 24 to control the aperture in the valve closing direction (in step S80). Therefore, an appropriate air flow rate can be ensured.

Thus, in a system using a turbo type air pump the shaft of which is supported by an air bearing like the air pump 21 according to the present embodiment, control of the command value of the pressure (i.e., the aperture of the back pressure valve 24) enables a feed at a desired air flow rate even when the command value of the rotational speed of the air pump 21 is near the lowest rotational speed (i.e., in the lowest range of the rotational speed) which is needed for flotation of the shaft in the air bearing. Therefore, it is possible to prevent excessive air feed to (the cathode 12 in) the fuel cell 10, and efficiently generate electric power while preventing overdrying of the electrolytic membrane. Thus, the reliability of the system is greatly improved. When the air feed increases, the air is likely to be dried, and the dried air causes the electrolytic membrane in the fuel cell 10 to be dried. Consequently, the I-V (current-voltage) characteristic of the fuel cell 10 is degraded, and therefore the power generation efficiency of the fuel cell 1 is lowered. However, in the fuel cell system 1 according to the present embodiment, occurrence of the above phenomenon can be suppressed, and the lowering of the system efficiency can also be suppressed by the prevention of useless air feed.

Further, in the low rotational speed range of the air pump 21, the amount of electric power generated by the fuel cell 10 is small, and therefore the amount of water generated by the electrochemical reaction is small. Consequently, the fuel cell 10 can be regarded to be in a situation in which the electrolytic membrane is likely to be dried. If an excessive amount of air is fed to the fuel cell 10 in the above situation, the electrolytic membrane is likely to be overdried (and therefore lowering of the power generation efficiency and degradation of the electrolytic membrane are likely to occur). However, according to the present embodiment, occurrence of the above phenomenon can be suppressed.

«Second Embodiment»

Next, the second embodiment is explained below with reference to the flow diagram of FIG. 3. In the explanations, FIG. 1 is also referred to when necessary. In the second embodiment, control of the aperture of the humidifier bypass valve 23 is added to the configuration of the fuel cell system illustrated in FIG. 1. Therefore, in the control flow diagram of FIG. 3, the same step numbers as FIG. 2 are assigned to the portions shared with the first embodiment, and explanations on the portions are not presented in this specification.

Figure 3:
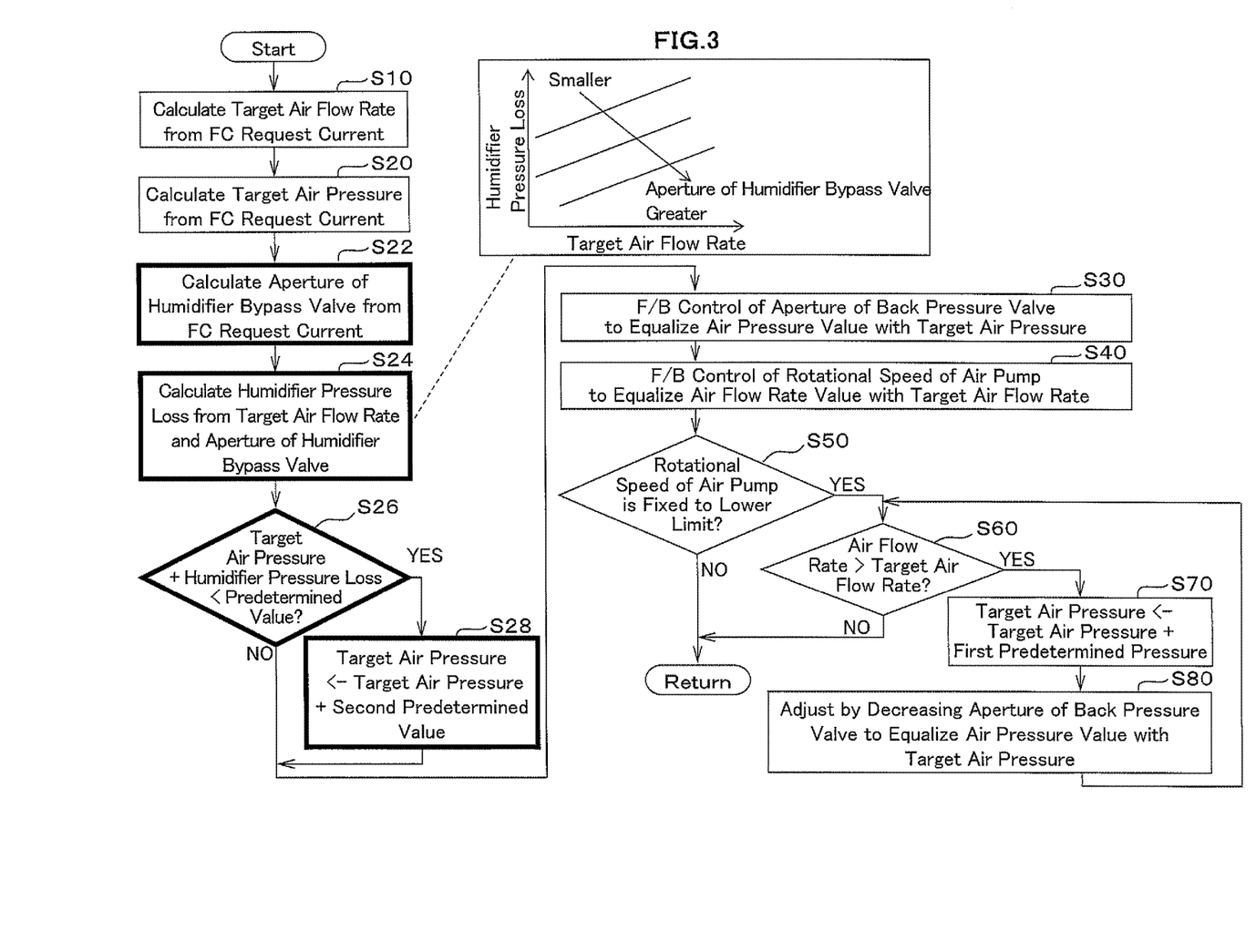
FIG. 3 is a flow diagram of control operations according to the second embodiment of the present invention.

As illustrated in FIG. 3, similarly to the first embodiment, the control device 40 performs step S10 (calculation of the target air flow rate) and step S20 (calculation of the target air pressure). Subsequently, the control device 40 calculates the aperture (the humidifier bypass-valve aperture) of the humidifier bypass valve 23 on the basis of the FC request current (in step S22). Thereafter, according to the second embodiment, the control device 40 calculates the pressure loss in the humidifier 22 (the humidifier pressure loss) on the basis of the target air flow rate and the aperture of the humidifier bypass valve 23 (in step S24).

A map indicating a relationship among the target air flow rate, the humidifier pressure loss, and the humidifier bypass-valve aperture is conceptually indicated in FIG. 3. As indicated in the map, the humidifier pressure loss increases with the target air flow rate, and decreases with increase in the humidifier bypass-valve aperture even when the target air flow rate is unchanged. The above map indicates "the relationship among the proportions controlled by the oxidant-flow regulating means, the target flow rate, and the pressure loss in the oxidant flow". The map indicating the relationship is only an example, and the relationship may be indicated by a function, a table, or other means.

The control device 40 determines (in step S26) whether or not the sum of the target air pressure and the humidifier pressure loss is smaller than a predetermined value, i.e., (the target air pressure)+(the humidifier pressure loss)<(the predetermined value). The predetermined value is set by experiment or simulation.

When (the target air pressure)+(the humidifier pressure loss)<(the predetermined value), i.e., when YES is determined in step S26, the control device 40 adds a second predetermined value to the target air pressure to calculate a new target air pressure. Then, the operation goes to step S30. When No is determined in step S26, the operation also goes to step S30. The second predetermined value is a value greater than zero, i.e., (the second predetermined value)>0. The second predetermined value is set by experiment or simulation. Since the operations performed in step S30 and the following steps are the same as the first embodiment, the explanations on the steps are not repeated.

In the fuel cell system 1 in which a device changing the air pressure loss (the humidifier bypass valve 23 in this example) is placed between the air pump 21 and the fuel cell 10, the aforementioned phenomenon, i.e., the increase in the air flow rate in the lower-limit rotational-speed range of the air pump 21, becomes prominent. Specifically, when the aperture of the humidifier bypass valve 23 is changed, the pressure loss in the section from the air pump 21 to the fuel cell 10 varies. Normally, the air feed is controlled such that the pressure at the inlet to (the cathode 12 of) the fuel cell 10 (which is detected by the pressure sensor Pb) is at a predetermined level. However, when the aperture of the humidifier bypass valve 23 changes, the pressure at the outlet of the air pump 21 (i.e., the air-pump compression ratio) changes, so that the extent of the ordinates of the "dispersion" range (illustrated in FIG. 4) greatly varies. Thus, the aforementioned phenomenon becomes prominent.

On the other hand, according to the second embodiment, the humidifier pressure loss is calculated (in step S24), control operations in consideration of the pressure loss are performed (in steps S26 and S28), a new target air pressure is set in consideration of the humidifier pressure loss, and the operation of controlling the back pressure valve 24 is performed in step S30 on the basis of the new target air pressure. Therefore, (unintended) increase in the air flow rate is suppressed, so that an appropriate air flow rate is ensured.

Thus, according to the second embodiment, the appropriate air flow rate enables appropriate operation of the fuel cell system 1 similarly to the first embodiment. Further, since the device which changes the air pressure loss in the section between the air pump 21 and the cathode 12 is additionally provided, according to the second embodiment, it is possible to more appropriately operate the fuel cell system 1 than the first embodiment.

«Other Matters»

In the second embodiment explained above, the map in FIG. 3 is referred to in step S24. For example, in the case where the device which controls the proportions of flows (the oxidant-flow regulating means) is a flow-rate regulator valve arranged in the bypass piping 20*b* (the humidifier bypass valve 23), and the aperture of the flow-rate regulator valve (the humidifier bypass valve 23) is greater than a predetermined aperture, and the compression ratio of the air pump 21 is expected to become low, the control device 40 may cause the air pump 21 to achieve the target air flow rate by increasing the target pressure in advance, i.e., by setting in advance a sum of a predetermined value (the third predetermined value) and the target pressure as a new target pressure. Each of the above predetermined values are appropriately set so as to adjust the actual flow rate to the target flow rate and achieve the purpose of feeding air at an appropriate air flow rate (i.e., so as to suppress an excessive flow rate).

«Third Embodiment»

Next, the third embodiment is explained below with reference to the flow diagrams of FIGS. 5 and 6. In the explanations, FIG. 1 is also referred to when necessary. In the third embodiment, the aperture of the back pressure valve 24 is controlled to be increased when a fuel-cell vehicle (which is a four-wheeled vehicle, a two-wheeled vehicle, or a vehicle of another type) on which a fuel cell system, for example, having the configuration of FIG. 1 is mounted decelerates and transitions from a running state to an idle state in which a minimum output of the fuel cell 10 is maintained (i.e., the electric power generated by the fuel cell 10 is set to a predetermined low-output state). That is, the aperture of the back pressure valve 24 is changed to be greater when the fuel-cell vehicle decelerates and transitions from a running state to an idle state than when the aperture of the back pressure valve 24 is controlled to be increased during a normal run. In the third embodiment, the same step numbers as FIG. 2 are assigned to the portions shared with the first embodiment, and explanations on the portions are not presented in this specification.

Figure 5:
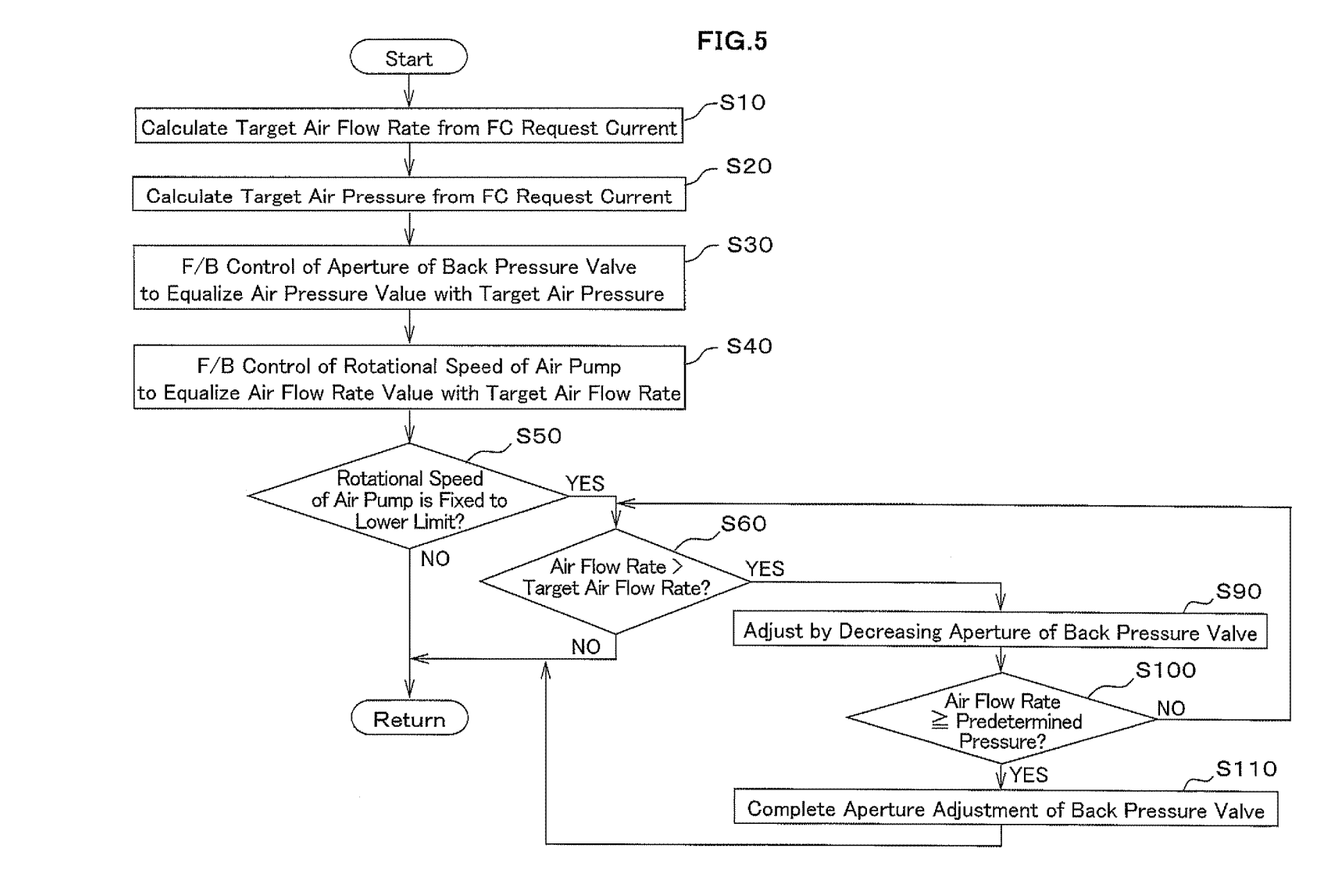
FIG. 5 is a flow diagram of control operations according to a third embodiment of the present invention.
Figure 6:
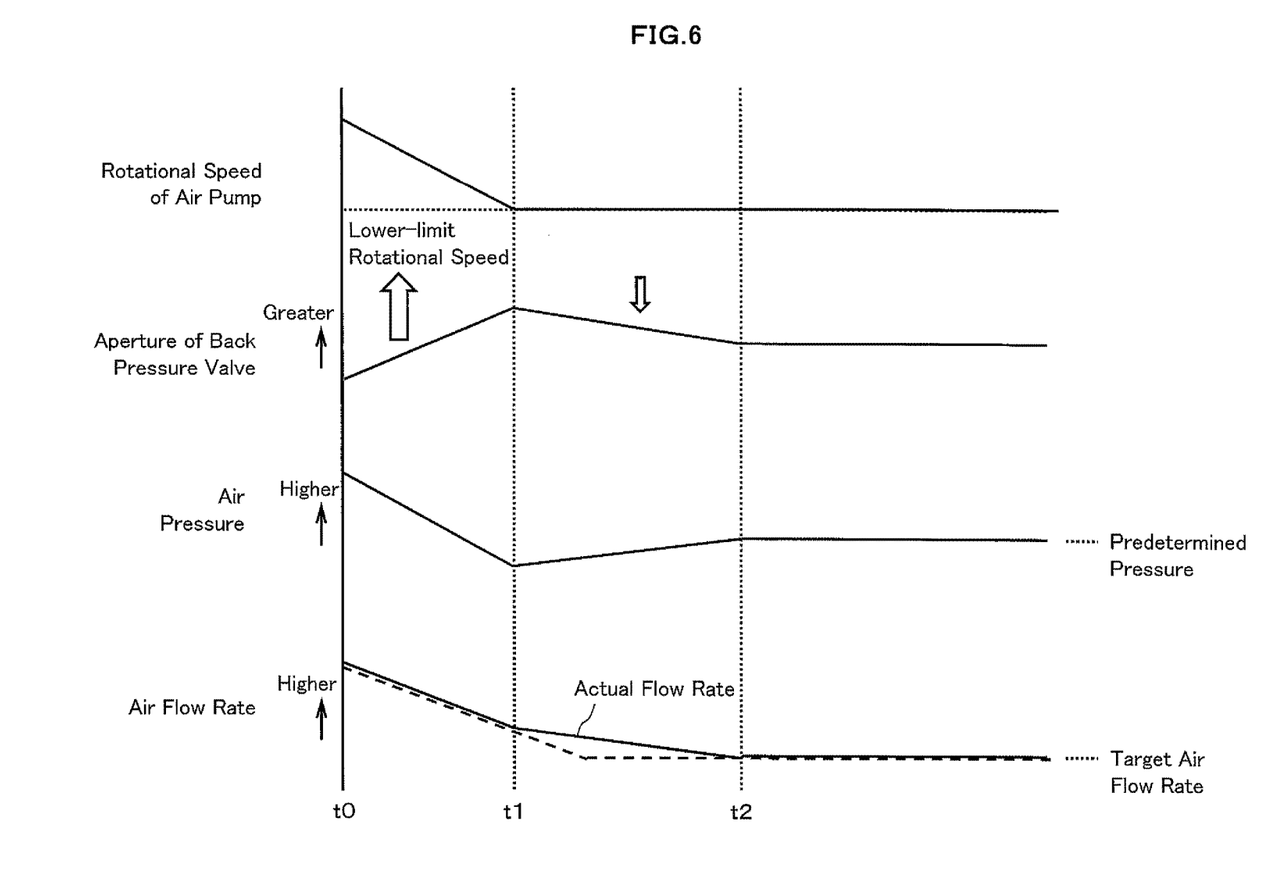
FIG. 6 is a timing diagram of the control operations according to the third embodiment of the present invention.

As illustrated in FIG. 5, when the control device 40 determines that the air flow rate (the actual flow rate) is greater than the target air flow rate, i.e., when YES is determined in step S60, the control device 40 changes the aperture of the back pressure valve 24 by a small amount (in step S90). That is, the control device 40 controls the aperture of the back pressure valve 24 to change the aperture by a smaller amount than the amount by which the aperture of the back pressure valve 24 is controlled to be increased when the deceleration causes the transition from the running state to the idle state.

Then, the control device 40 determines whether or not the air pressure is equal to or greater than a predetermined pressure (in step S100), where the predetermined pressure is a threshold for determining whether to complete the aperture adjustment of the back pressure valve 24. When the control device 40 determines that the air pressure is not equal to or greater than the predetermined pressure, i.e., when NO is determined in step S100, the operation goes back to step S60. When the control device 40 determines that the air pressure is equal to or greater than the predetermined pressure, i.e., when YES is determined in step S100, the control device 40 completes the aperture adjustment of the back pressure valve 24 (in step S110).

Further explanations are presented below with reference to FIG. 6. In order to cause a transition to a predetermined low-output state (e.g., an idle state), the aperture of the back pressure valve 24 is controlled to be increased, and the rotational speed of the air pump 21 is lowered (in the period from time t0 to t1). Specifically, the aperture of the back pressure valve 24 is controlled to be increased by the operation in step S30 in FIG. 5, and the rotational speed of the air pump 21 is controlled to be lowered by the operation in step S40 in FIG. 5, so that the air pressure is greatly lowered.

After the aperture of the back pressure valve 24 is controlled to be increased, at time t1, the rotational speed of the air pump 21 reaches the lower limit of the rotational speed, so that the rotational speed of the air pump 21 cannot be further lowered, i.e., YES is determined in step S50. In this case, when the air flow rate (the actual flow rate indicated by the solid line) does not yet reach the target air flow rate (indicated by the dashed line), i.e., when YES is determined in step S60, excessiveness of the air flow rate (the actual flow rate) is detected, so that increase of the air pressure is necessary. Therefore, in order to decrease the air flow rate (the actual flow rate) by increasing the air pressure, the aperture of the back pressure valve 24 is changed in the valve closing direction in small steps (in step S90). Since the aperture of the back pressure valve 24 is changed in the valve closing direction in small steps, the air pressure increases. Thus, the change of the aperture of the back pressure valve 24 in small steps causes the air flow rate (the actual flow rate) to gradually decrease.

Thereafter, when the aperture adjustment of the back pressure valve 24 causes the air pressure to reach the predetermined pressure, i.e., when YES is determined in step S100, the aperture adjustment of the back pressure valve 24 is completed (in step S110). At this time, the air flow rate (the actual flow rate) is equalized with the target air flow rate.

Thus, according to the third embodiment, in the case where the air flow rate (the actual flow rate) is still greater than the target air flow rate even when the rotational speed of the air pump 21 decreases to the lower limit of the rotational speed (the lower range of the rotational speed) after the aperture of the back pressure valve 24 is greatly changed in the valve opening direction during a transition from a running state to an idle state, the aperture of the back pressure valve 24 is changed in the valve closing direction in small steps, so that the air pressure (the pressure of the oxidant gas) can be increased and the air flow rate (the actual flow rate) can be lowered to the target flow rate. Since the aperture of the back pressure valve 24 is adjusted as above, (unintended) increase in the air flow rate is suppressed, and appropriate air flow rate can be ensured.

In addition, according to the third embodiment, the timing of completion of the aperture adjustment of the back pressure valve 24 can be appropriately controlled by completing the aperture adjustment of the back pressure valve 24 when the air pressure rises to the predetermined pressure.

Further, in the case where the output of the fuel cell 10 is set to a predetermined low-output state (an idle state), according to the third embodiment, increase in the air flow rate can be suppressed and appropriate air flow rate can be ensured.

In the explanations of the third embodiment, the case in which the vehicle decelerates and transitions to the idle state is taken as an example of a case in which the aperture control of the back pressure valve 24 is performed. However, the third embodiment can be applied to not only the above case. For example, the third embodiment can also be applied to the case in which the actual flow rate cannot be lowered to the target air flow rate because of some fluctuation of the actual flow rate caused by temporary variations in the electric power fed to the air pump 21 due to variations in the total load on the vehicle which are caused by, for example, a start of use of a heater.

LIST OF REFERENCES

1: Fuel Cell System
10: Fuel cell
11: Anode
12: Cathode
20: Air Feed System
20a: Air Feed Piping (Oxidant Feed Path)
20b: Bypass Piping (Humidifier Bypass)
20c: Air Exhaust Piping (Oxidant Exhaust Path)
21: Air Pump (Oxidant Pump)
22: Humidifier
23: Humidifier Bypass Valve (Oxidant-flow Regulating Means, Flow-rate Regulator Valve)
24: Back Pressure Valve (Pressure Regulating Means)
30: Hydrogen Feed System
31: Hydrogen Feed Apparatus
40: Control Device (Control Means, Rotational-speed Confirmation Means)
Pb: Pressure Sensor (Pressure Detection Means)
Q: Actual-flow-rate Detection Means (Flow-rate Sensor)

The invention claimed is:
1. A fuel cell system comprising:
a fuel cell to which fuel gas and oxidant gas are fed and which generates electric power;
an oxidant feed path to the fuel cell;
an oxidant pump of a turbo type in which a shaft is supported by an air bearing, and which takes in and sends out the oxidant gas by rotary motion;
a flow-rate sensor detecting an actual-flow-rate of the oxidant gas;
a pressure sensor sensing a pressure of the oxidant gas;
a control device including a processor and a memory storing software instructions, and receives a target current value of the fuel cell from an external device;
a humidifier arranged between the oxidant pump and the fuel cell;
a humidifier bypass which bypasses the humidifier; and
a humidifier bypass valve which controls proportions of the oxidant gas between the humidifier and the humidifier bypass by an opening degree of the humidifier bypass valve; and
a back pressure valve, an aperture of which is adjusted to adjust the pressure of the oxidant gas,
wherein when the software instructions stored in the memory is executed by the processor of the control device, the control device is programmed to:
set a target flow rate of the oxidant gas and a target pressure of the oxidant gas in accordance with the target current value of the fuel cell;
calculate opening degree of the humidifier bypass valve in accordance with the target current value of the fuel cell;
calculate a value of pressure loss of the oxidant gas at the calculated opening degree of the humidifier bypass valve and the target flow rate on the basis of a relationship among the opening degree of the humidifier bypass valve, the target flow rate, and the pressure loss of the oxidant flow;

determine whether a sum of the target pressure and the value of the pressure loss of the oxidant gas is smaller than a first predetermined value; and add a second predetermined value to the target pressure to set a new target pressure of the oxidant gas if the sum of the target pressure and the value of the pressure loss of the oxidant gas is smaller than the first predetermined value, adjust the opening degree of the humidifier bypass valve in accordance with a calculated opening degree of the humidifier bypass valve, and adjust the opening degree of the aperture of the back pressure valve so that the pressure of the oxidant gas becomes equal to the calculated new target pressure of the oxidant gas.

2. The fuel cell system according to claim 1, wherein when the target pressure is set according to the proportions controlled by oxidant-flow regulating means, the oxidant-flow regulating means is a flow-rate regulator valve arranged in the humidifier bypass, and in the case where an aperture of the flow-rate regulator valve is set greater than a predetermined aperture, the execution of the software instructions stored in the memory of the control device causes the control device to set in advance a sum of a predetermined value and the target pressure as a new target pressure.

3. The fuel cell system according to claim 1, wherein the fuel cell system further comprises:

a back pressure valve, an aperture of which is adjusted to adjust the pressure of the oxidant gas, wherein when the software instructions stored in the memory is executed by the processor of the control device, the control device is further programmed to:

confirm a rotation-speed of the oxidant pump;

determine whether the rotation-speed of the oxidant pump is equal to the lower limit of the rotation-speed of the oxidant pump, determine whether the actual-flow rate of the oxidant gas is greater than the target flow rate of the oxidant gas if the rotation-speed of the oxidant pump has been determined to be equal to the lower limit of the rotation-speed of the oxidant pump, add a third predetermined value to the target pressure to set a new target pressure of the oxidant gas if the actual-flow rate of the oxidant gas has been determined to be greater than the target flow rate of the oxidant gas; and control the back pressure valve to decrease an opening degree of the aperture of the back pressure valve in order to control the pressure of the oxidant gas to be equal to the new target pressure.

* * * * *